United States Patent
Renz et al.

(10) Patent No.: US 7,492,245 B2
(45) Date of Patent: Feb. 17, 2009

(54) BROADBAND OVER POWER LINES (BPL) COUPLING SYSTEM

(75) Inventors: Bruce A. Renz, Columbus, OH (US); David Long, Northborough, MA (US); Todd W. Sandahl, E. Walpole, MA (US)

(73) Assignee: Amperion, Inc., Lowell, MA (US)

( * ) Notice: Subject to any disclaimer, the term of this patent is extended or adjusted under 35 U.S.C. 154(b) by 396 days.

(21) Appl. No.: 11/345,623

(22) Filed: Jan. 31, 2006

(65) Prior Publication Data
US 2007/0176723 A1    Aug. 2, 2007

(51) Int. Cl.
*H01F 27/02* (2006.01)
*H01F 17/06* (2006.01)

(52) U.S. Cl. ............................ 336/92; 336/175; 336/176

(58) Field of Classification Search ................... 336/92, 336/175, 176
See application file for complete search history.

(56) References Cited

U.S. PATENT DOCUMENTS

| | | | | |
|---|---|---|---|---|
| 4,983,932 A | * | 1/1991 | Kitagawa ..................... | 333/12 |
| 6,160,466 A | * | 12/2000 | Kawai ......................... | 336/176 |
| 6,259,346 B1 | * | 7/2001 | Nakano ....................... | 336/175 |
| 6,512,425 B2 | * | 1/2003 | Morita et al. ................ | 333/12 |
| 6,515,230 B1 | * | 2/2003 | Hirakawa et al. ............. | 174/92 |
| 6,559,748 B1 | * | 5/2003 | Nakano ....................... | 336/176 |
| 7,012,496 B2 | * | 3/2006 | Sugiura et al. ............... | 336/92 |

\* cited by examiner

*Primary Examiner*—Anh T Mai
(74) *Attorney, Agent, or Firm*—Lowe Hauptman Ham & Berner LLP

(57) ABSTRACT

An inductive coupler provides an interface between a power line and a communication device which communicates via the power line. The power line operates at a potential between four and 140 kilovolts while accommodating a current having a frequency between 45 and 65 hertz, and the communication device operates substantially at ground potential. The inductive coupler includes a split ferrite core having material selected to provide a substantially flat frequency response between one and 50 megahertz. The coupler also includes a clamping mechanism allowing the inductive coupler to clamp around the power line or around a utility line connected to the power line. Further, the coupler includes at least one lead for communicatively connecting the inductive coupler to the communication device. The inductive coupler forms an air gap when the inductive coupler is clamped. If the coupler is insulated, the insulation is also used for the air gap.

16 Claims, 6 Drawing Sheets

BROADBAND OVER POWER LINES (BPL) COUPLING SYSTEM

TECHNICAL FIELD

The present invention relates to communication via power transmission lines, and more particularly to broadband communication via power lines (BPL).

BACKGROUND OF THE INVENTION

BPL requires the transfer of high frequency (HF) signals, from communication devices operating at ground potential, to medium voltage (4-35 kV) power lines, and vice versa. Couplers are used for such transfers, and these couplers must accurately inject and extract tiny HF signals while being unaffected by the much larger currents and voltages (having low frequencies on the order of 50 or 60 Hz) that normally exist on medium voltage (MV) power lines. In addition, these couplers must be designed to withstand the transient voltages and currents that occasionally occur on MV lines as a result of switching operations, lightning strikes, electrical faults and other such phenomena. Furthermore, these couplers must be designed to fail in a manner that does not create a safety hazard for the general public, which normally is at or near ground potential. If a coupler fails to meet these essential criteria, then the coupler not only fails to serve any purpose, but can actually cause damage and danger.

SUMMARY OF THE INVENTION

The revolution in information technologies that has transformed other industries has yet to fully take hold in the electric power business. One key to extending this revolution to the electric power industry will be development of powerline communication (PLC) equipment that efficiently and reliably delivers high-speed broadband over medium-voltage (MV) power lines.

The present invention provides coupling equipment for BPL over MV power lines. In this newly emerging technology, there are no commercially available couplers that meet all the criteria that are essential for such a device to serve its purpose, while safeguarding equipment as well as the general public.

The present invention is a high frequency inductive coupler that can be clamped around an MV power conductor. This coupler has an essentially flat frequency response from 1 to 50 MHz. The present invention can be implemented in various embodiments, depending upon the application.

For overhead power lines, the coupler of this invention includes insulation between the line side of the coupler and the grounded secondary. Also, the secondary leads are themselves insulated to withstand momentary contact with other MV phases of a multi-phase MV distribution circuit. This coupler operates correctly in the presence of 50 or 60 Hz steady state currents as high as 600 amperes, and is not damaged by momentary (up to 12 cycles) 50 or 60 Hz currents as high as 20,000 amperes.

For underground MV power circuits, as opposed to overhead power lines, an uninsulated form of this coupler is used. In this case, the MV cable provides the insulation, and the coupler is clamped around the cable beyond where the cable's ground shield has been stripped back, as is typical at cable termination points. A larger window unit can also be placed directly over the cable's elbow termination. Except for the absence of an MV insulation system, this underground coupler is essentially the same as the overhead version.

The underground coupler can also be applied on overhead circuits when clamped around the ground lead of utility devices that are connected from line to ground and that are able to pass high frequency signals; this would include such normal utility equipment as capacitors, resistive voltage dividers, surge arresters, and the like. This underground coupler can also be employed on MV, and even HV (69 to 138 kV) overhead circuits, when deployed as part of a communications unit that floats on the energized conductor and is powered by the 50 or 60 Hz current in that line.

This coupler employs a hinged, split ferrite core that is selected for its high frequency characteristics, and so it has a flat frequency response (i.e. equally sensitive to all frequencies) from 1 to 50 MHz. In other words, the insertion loss over this passband is substantially flat, so that the decibel loss is substantially constant from 1 to 50 MHz. The flat channel response is a desirable trait in the preferred embodiment of the present invention, and is an absolute requirement in other systems in which the coupler is used as a standalone device. The ferrite material is critical, and two materials work well, in custom-cut configurations: Fair-Rite 61 Material and Fair-Rite 52 Material, both produced by the Fair-Rite Products Corporation. Both the 61 and 52 materials are nickel-zinc ferrites (NiZn). Nickel-zinc ferrites generally work well in high frequency designs.

The design is such that when the unit is clamped in place, a small fixed air gap is established that prevents the core from being saturated by power frequency currents which pass through its window. The coupler's winding structure is designed to accommodate a 1-50 MHz passband requirement. The air gap acts as a barrier to prevent power saturation from the power line. The air gap is a space between the upper (unwound) and lower (wound) half of the ferrite toroid. The size of the gap is controlled by the plastic material which surrounds the two halves of the ferrite. Although this gap is actually filled with plastic, it is still considered an air gap in the jargon with which persons skilled in the art are familiar. This dimension is critical; as the gap increases, the current on the power line has less degrading effect on the magnetics, and therefore, on the signal. As the gap dimension increases, the signal loss also increases, so there is a "sweet spot" at which the immunity to power line current and signal loss are at the most optimal balance.

The insulated version, primarily for overhead use, includes a multi-element insulation structure that can withstand the power frequency voltage stresses of MV lines. In addition, this coupler structure meets industry standards for impulse voltages with respect to basic impulse insulation BIL, and also for radio influence voltage (RIV). In the event of a line-to-ground failure of the insulation system, the low voltage leads are sized to instantly evaporate, thereby reducing the probability of a sustained fault on the MV system, which therefore reduces associated risk to the public as well as the risk of a resultant circuit outage. The physical design of both insulated and uninsulated couplers is shown in the attached drawings.

The coupler of the present invention has a printed circuit board with dual functions. The circuit board provides an impedance match between the broadband over power line (BPL) modem and the wound toroid, while also providing transient voltage suppression by means of a gas discharge tube, a Transient Voltage Suppressor (TVS) diode array, and high voltage capacitors.

It is to be understood that all of the present figures, and the accompanying narrative discussions of best mode embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures described in this application can be implemented by a variety of different combinations of hardware and software, and in various configurations which need not be further elaborated herein.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

BEST MODE FOR CARRYING OUT THE INVENTION

The present invention can be implemented in various different embodiments, and one preferred embodiment will now be described.

Figure 1B:
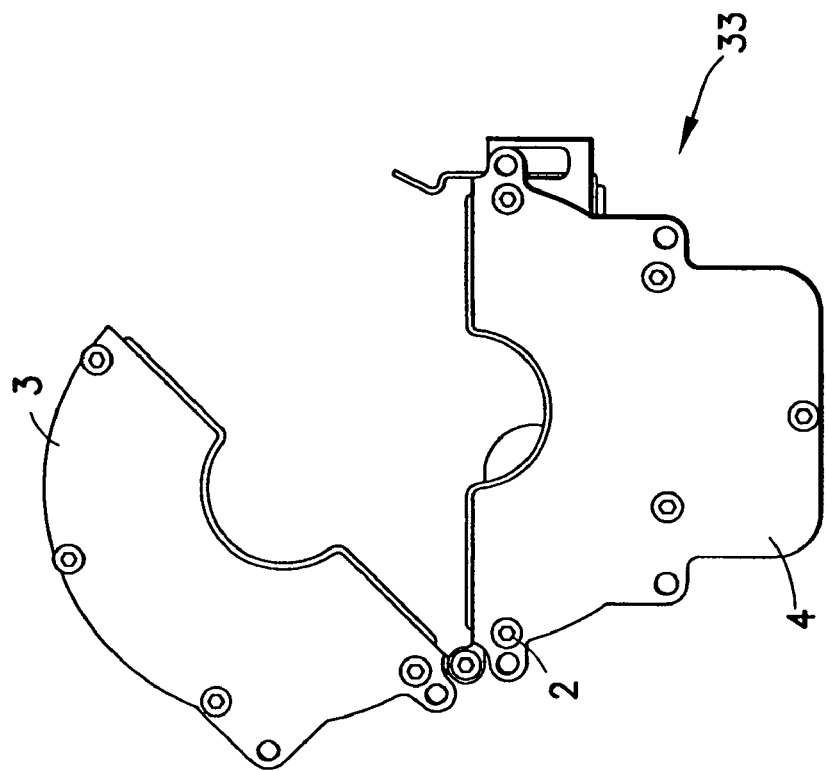
FIG. 1(b) is a left side view of the coupler shown in FIG. 1(a).
Figure 1A:
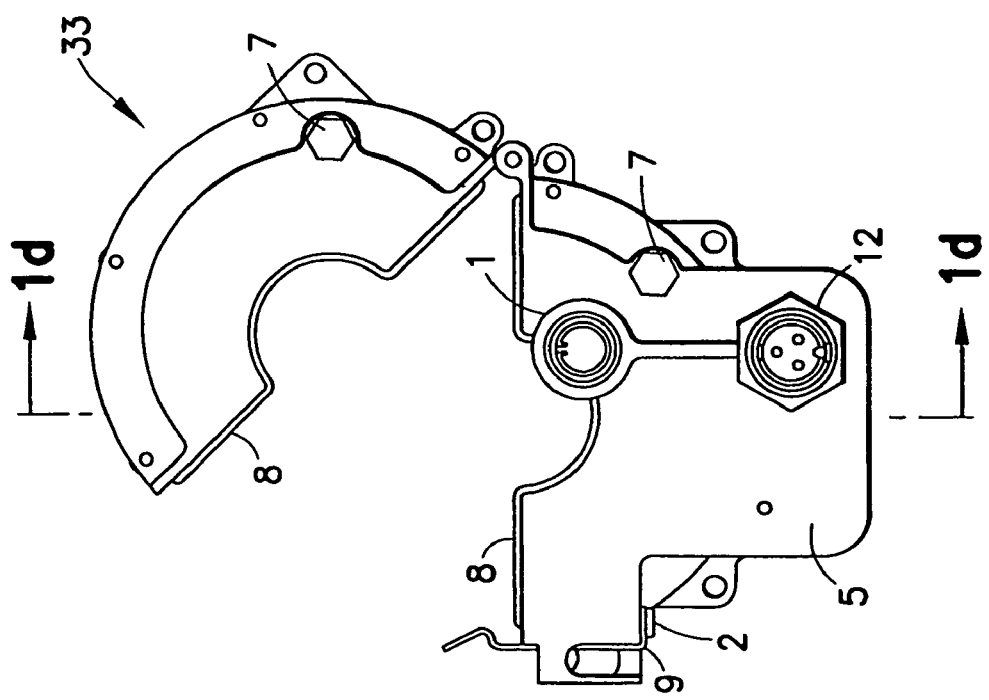
FIG. 1(a) is a right side view of a 1.2 inch uninsulated coupler according to an embodiment of the present invention.

As shown in FIG. 1(a), a 1.2 inch uninsulated coupler 33 is designed to be placed around the insulation of a jacketed power line. The coupler has two halves held together by a hinge assembly on one side, and a latch 9 and screw 2 on the other side. The coupler includes two portions of a ferrite toroid which is used to couple the signal to the power line. A first portion 10 of the toroid is wound with sixteen turns of magnet wire, while the other portion 13 of the toroid is provided as a magnetic return path to complete the circuit. Also shown in FIG. 1(a) are a connector dust cap 1, and also a thread lock/sealant 12 for plastic fasteners.

The two portions 10 and 13 of the ferrite toroid are held in place within a metal housing 5, and within the cover pieces 3 and 4 shown in FIG. 1(b). These portions 10 and 13 are held in place by sanoprene core spacers 8.

The dimension between the two portions of the toroid is critical to minimizing noise caused by the power line, and that dimension is maintained by the sanoprene spacers when the assembly is in the closed position. This dimension is referred to as an "air gap," even though in this case it is filled in by sanoprene. The communication signal is fed to and from the wound core assembly by way of the coupler board 6 shown in FIG. 1(c). The coupler board provides impedance matching and surge protection. The metal case is grounded using an external cable assembly attached to ¼-20 hex bolts 7.

Figure 1D:
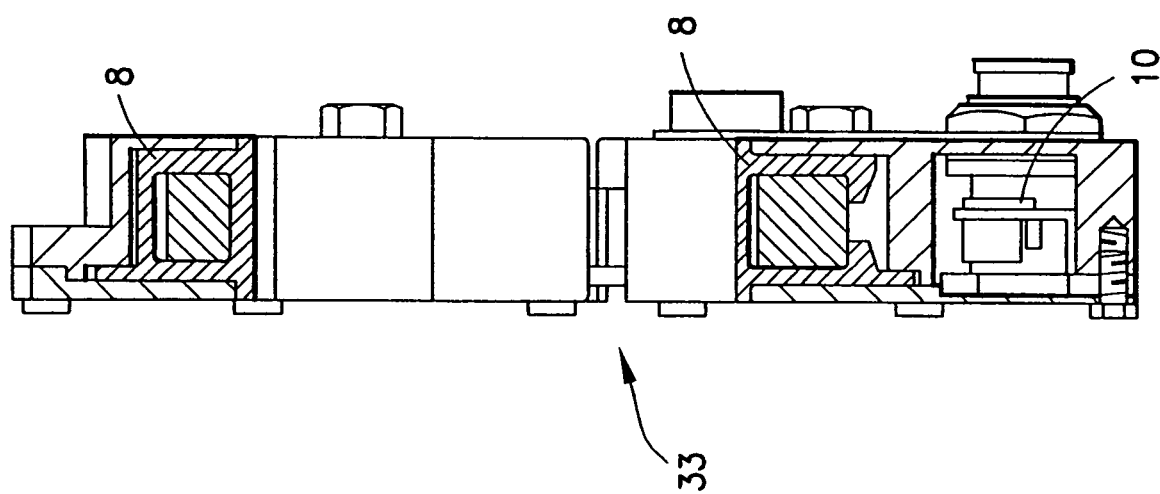
FIG. 1(d) is a front view of the coupler shown in FIG. 1(a).
Figure 1C:
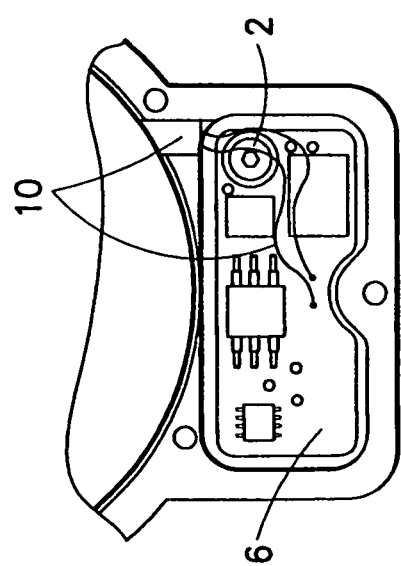
FIG. 1(c) is detail of a coupler board of the coupler shown in FIG. 1(a), with cover removed for clarity.

FIG. 1(d) is a front view of the coupler, which shows in more detail the configuration of the sanoprene spacers 8, which are molded parts that hold the core inside the metal housing, and the spacers 8 have features to maintain the spacing between the two core portions 10 and 13. This spacing 8 is the air gap.

Figure 2B:
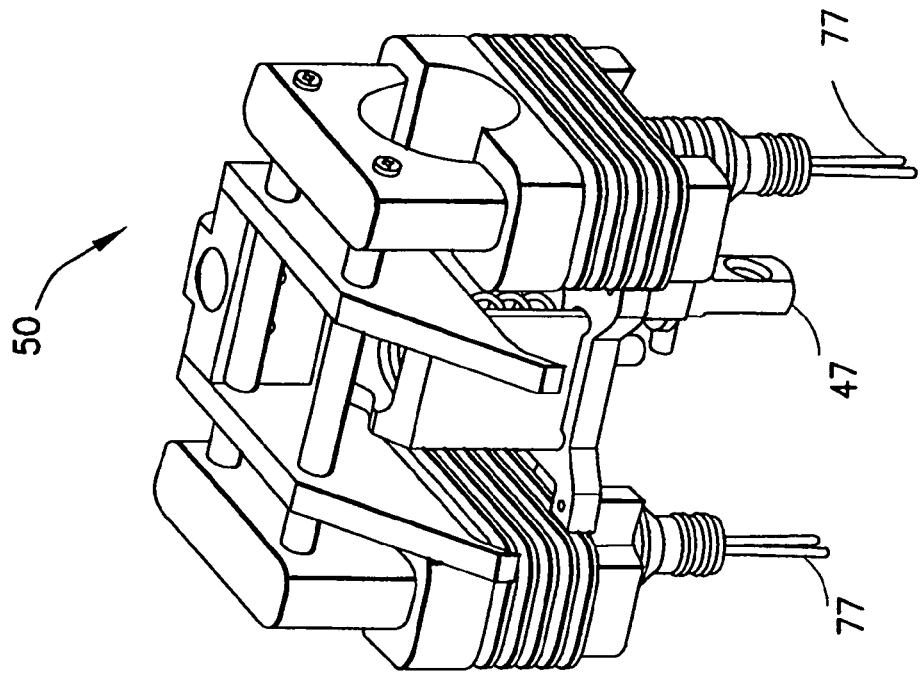
FIG. 2(b) is an assembled view of the insulated coupler already shown in FIG. 2(a).
Figure 2A:
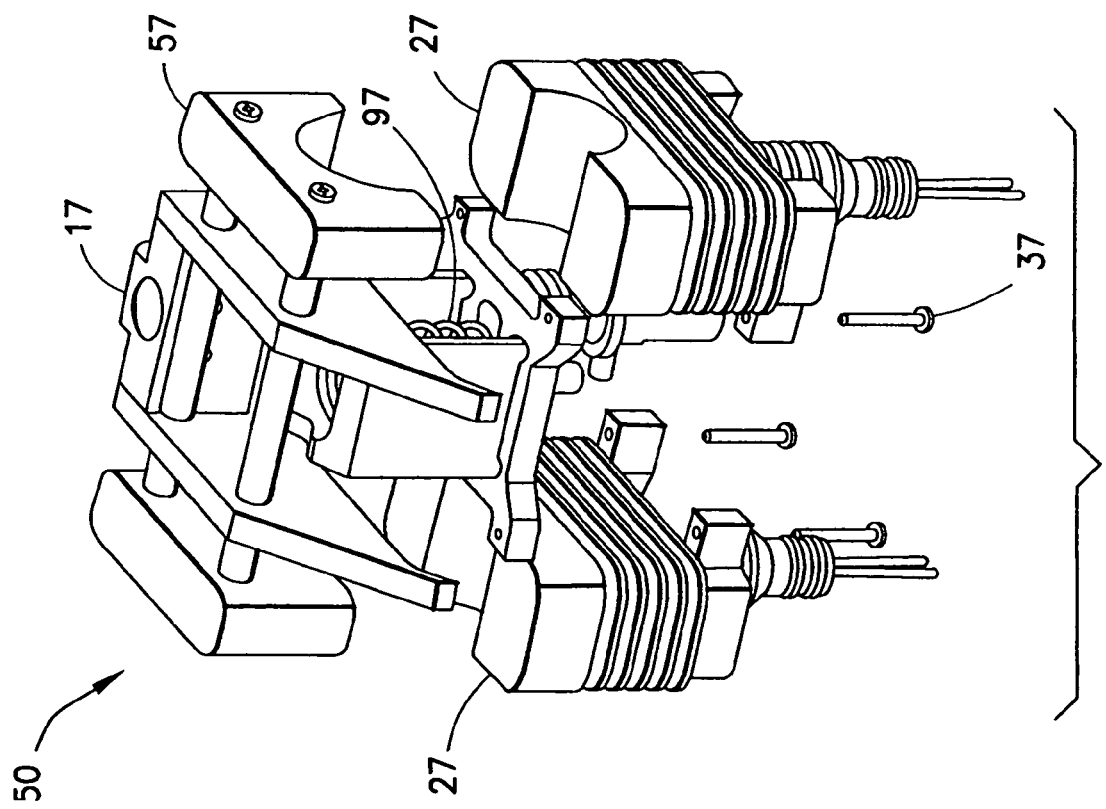
FIG. 2(a) is an exploded view of an insulated coupler according to an embodiment of the present invention.

FIG. 2(a) shows an insulated coupler 50 instead of an uninsulated coupler, and of course FIG. 2(a) gives an exploded view. The insulated coupler 50 is comprised of two major assemblies, the upper core and clamp assembly 17 and the lower core assembly 27. The upper and lower assemblies are spread apart by way of the jackscrew 47, which was designed to accommodate a "hot-stick" mounting tool common to the power industry. A spring 97 is integrated into the lower core assembly to provide opposing tension to the upper core and help to maintain the position of the assembly on a power line.

Unlike the uninsulated coupler shown in FIG. 1(a), the insulated coupler 50 has two ferrite toroids instead of one. Each nickel zinc (NiZn) ferrite toroid is cut into two halves by the manufacturer. One half is installed as-is in the upper core housing 57. The other half is wound with five turns of heavily insulated wire, with approximately twelve feet of wire continuing from each end of the windings. This pair of wire 77 is passed through a hole in the bottom of the lower core assembly 27 and the lower core is installed and fastened into place. The two pairs of wire 77 correspond to the two ferrite toroids.

When assembled as such, there is a consistent dimension maintained between the upper unwound core and the lower wound core of each toroid. Although this dimension is filled with the plastic material of which the housings are constructed, it is referred to as an "air gap." The plastic material may, for example, be polyvinylchloride (PVC). Although much of the housing of the insulated coupler 50 can be PVC, the air gap is specifically located where each upper toroid is separated from the respective lower toroid.

Figure 3A:
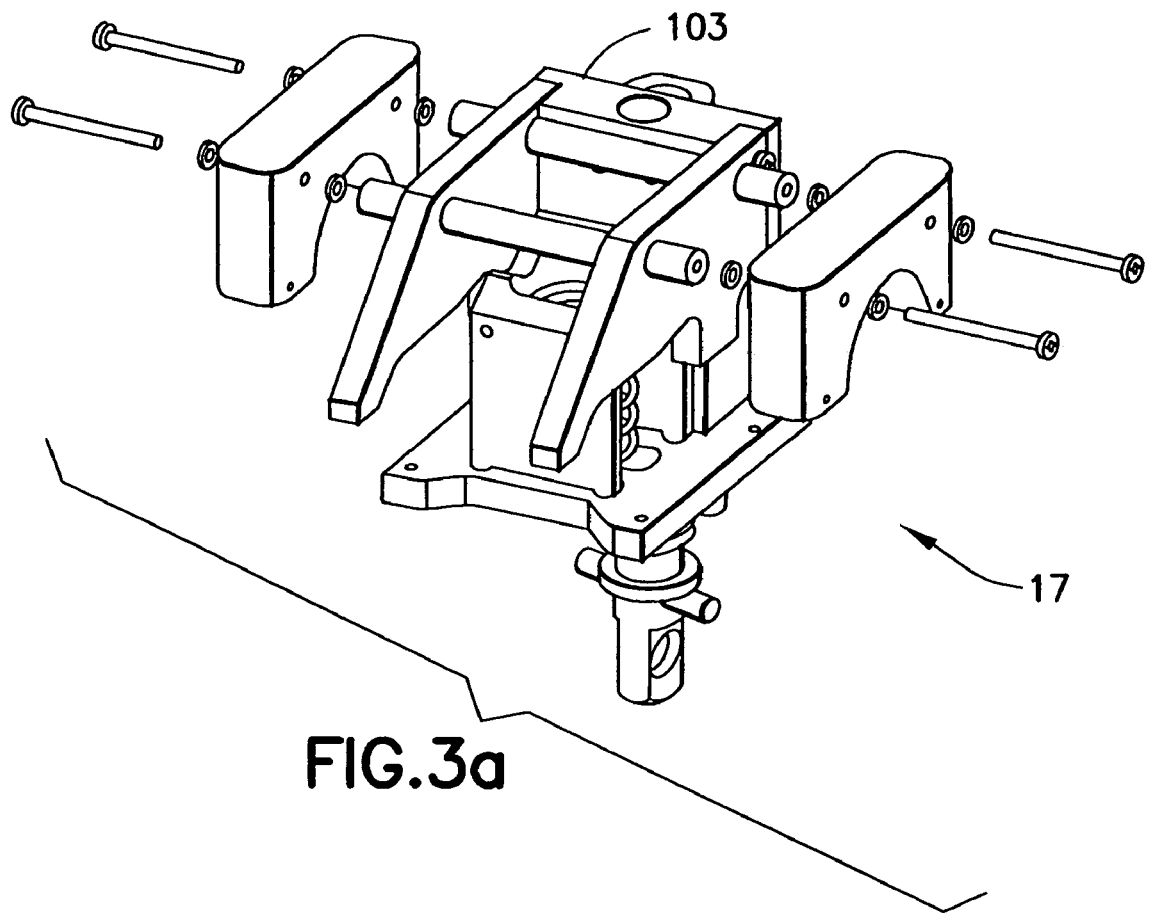
FIG. 3(a) is an exploded view of an upper part of the insulated coupler shown in FIG. 2(a).
Figure 3B:
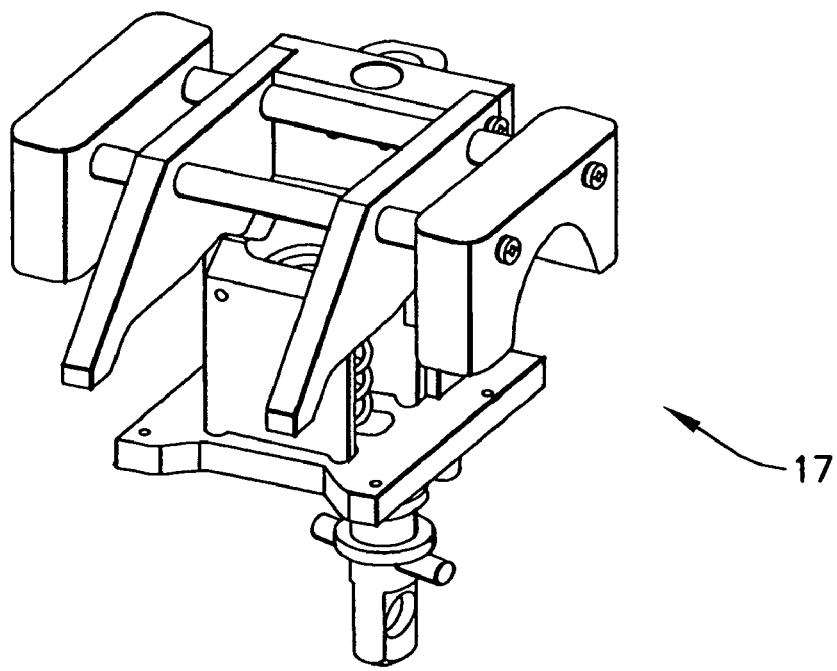
FIG. 3(b) is an assembled view of the upper part shown in FIG. 3(a).
Figure 4A:
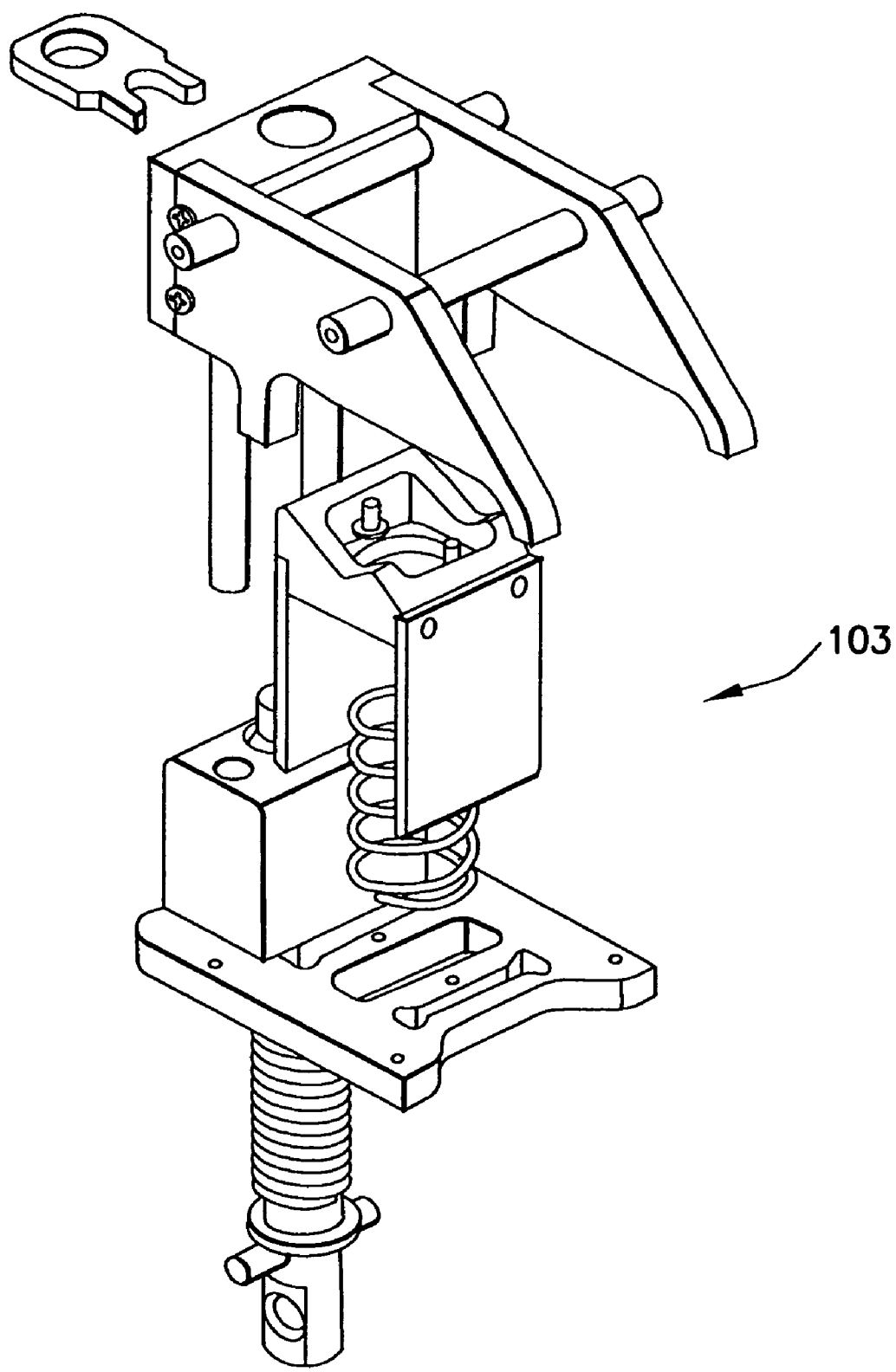
FIG. 4(a) is an exploded view of a clamp assembly that is a piece of the upper part shown in FIG. 3(a).
Figure 4B:
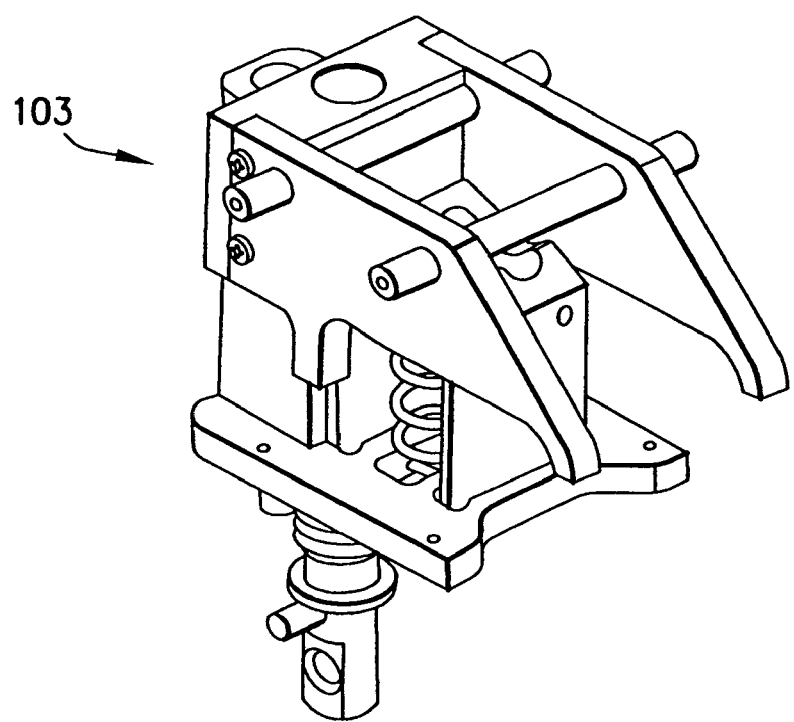
FIG. 4(b) is a top assembled view of the clamp assembly shown in FIG. 4(a).
Figure 4C:
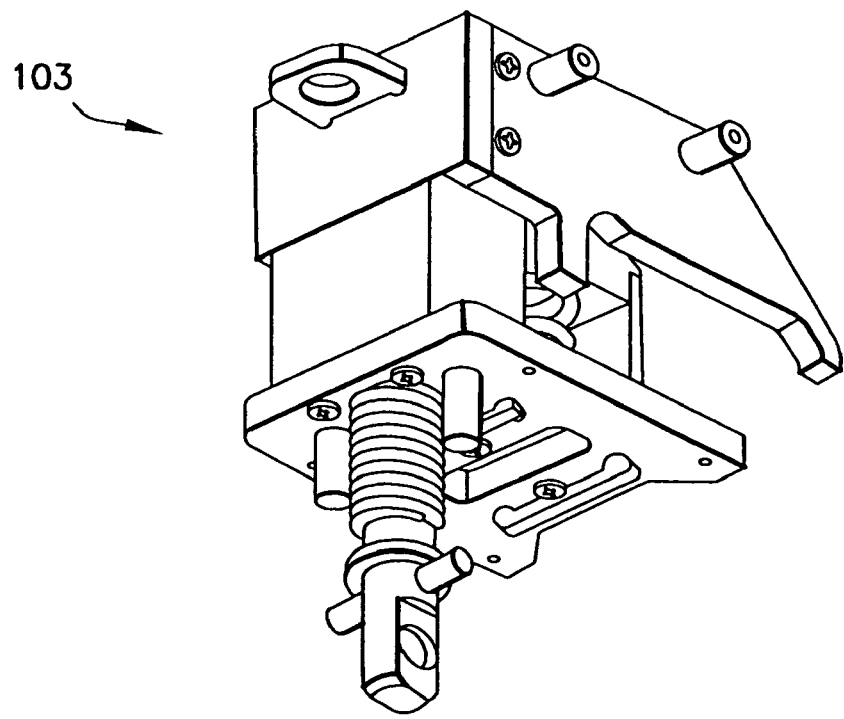
FIG. 4(c) is a bottom assembled view of the clamp assembly shown in FIG. 4(a).

FIG. 3(a) is an exploded view of the upper part 17 of the insulated coupler 50 that was already shown in FIG. 2(a). FIG. 3(b) is an assembled view of that same upper part 17. The upper part 17 is not a stand alone product, but rather operates in conjunction with the lower portion 27 of the insulated coupler that was shown in FIG. 2(a). The module 103 of the upper part 17 is shown in greater detail by FIGS. 4(a) thru 4(c). FIG. 4(a) is an exploded view of the module 17, FIG. 4(b) is a top assembled view, and FIG. 4(c) is a bottom assembled view, and all of these views will be understood by a person skilled in the art, in view of the above description.

This has been a best mode description of embodiments of the present invention. This description is provided only by way of example, and does not in any way limit the scope of the present claimed invention. A person skilled in the art will understand that various different materials and configurations can be arranged in a variety of ways to achieve the type of apparatus that is the subject of the present invention.

What is claimed is:

1. An inductive coupler for providing an interface between a power line and a communication device which communicates via the power line, wherein the power line operates at a potential between four and 140 kilovolts while accommodating a current having a frequency between 45 and 65 hertz, and wherein the communication device operates substantially at ground potential, said inductive coupler comprising:

a nickel-zinc split ferrite core having material selected to provide a substantially flat frequency response between one and 50 megahertz;

a clamping mechanism allowing the inductive coupler to clamp around the power line or around a utility line connected to the power line; and at least one lead for communicatively connecting the inductive coupler to the communication device, wherein the inductive coupler forms an air gap when the inductive coupler is clamped, wherein the air gap is substantially filled, and wherein the air gap is located at least at a location between halves of the split ferrite core.

2. The inductive coupler of claim 1, wherein the air gap is substantially filled with plastic, and wherein a dimension of the air gap is such as to substantially minimize noise caused by coupler saturation.

3. The inductive coupler of claim 2, wherein the coupler is an insulated coupler; and wherein insulation of the insulated coupler is comprised of the plastic that fills the air gap.

4. The inductive coupler of claim 3, wherein the air gap has a width substantially equal to a width of the insulation adjacent to the air gap.

5. The inductive coupler of claim 1, wherein the air gap is dimensioned to reduce insertion loss and substantially minimize noise caused by the ferrite core going into saturation.

6. The inductive coupler of claim 1, wherein the power line is an underground line providing insulation, and wherein the clamping mechanism includes a hinge connecting the split ferrite core.

7. The inductive coupler of claim 1, wherein the coupler has a substantially toroidal shape when clamped.

8. The inductive coupler of claim 7, wherein the air gap protects the coupler from becoming saturated by power from the power line.

9. The inductive coupler of claim 1, wherein the at least one lead is sized to evaporate, in the event of a line to ground failure that exposes the at least one lead to power from the power line.

10. An inductive coupler for providing an interface between a power line and a communication device which communicates via the power line, wherein the power line operates at a potential between four and 140 kilovolts while accommodating a current having a frequency between 45 and 65 hertz, and wherein the communication device operates substantially at ground potential, said inductive coupler comprising:

a split ferrite core having material selected to provide a substantially flat frequency response between one and 50 megahertz;

a clamping mechanism allowing the inductive coupler to clamp around the power line or around a utility line connected to the power line; and at least one lead for communicatively connecting the inductive coupler to the communication device, wherein the inductive coupler forms an air gap when the inductive coupler is clamped, wherein the power line is an overhead line, and wherein the inductive coupler further comprises insulation between a line side of the coupler and a grounded secondary.

11. The inductive coupler of claim 10, wherein the power line is an underground line providing insulation, and wherein the clamping mechanism includes a hinge connecting the split ferrite core.

12. The inductive coupler of claim 10, wherein the coupler has a substantially toroidal shape when clamped.

13. The inductive coupler of claim 10, wherein the air gap protects the coupler from becoming saturated by power from the power line.

14. The inductive coupler of claim 10, wherein at least one lead is sized to evaporate, in the event of a line to ground failure that exposes at least one lead to power from the power line.

15. An inductive coupler for providing an interface between a power line and a communication device which communicates via the power line, wherein the power line operates at a potential between four and 140 kilovolts while accommodating a current having a frequency between 45 and 65 hertz, and wherein the communication device operates substantially at ground potential, said inductive coupler comprising:

a nickel-zinc split ferrite core;

a clamping mechanism allowing the inductive coupler to clamp around the power line or around a utility line connected to the power line; and at least one lead for communicatively connecting the inductive coupler to the communication device, wherein the inductive coupler forms an air gap when the inductive coupler is clamped, wherein the air gap is substantially filled, wherein a dimension of the air gap is such as to substantially minimize noise caused by coupler saturation, wherein the coupler is an insulated coupler;

wherein insulation of the insulated coupler is comprised of the material that fills the air gap, and wherein the air gap is located at least at a location between halves of the split ferrite core.

16. The inductive coupler of claim 15, wherein the air gap is dimensioned to reduce insertion loss and substantially minimize noise caused by the ferrite core going into saturation.

* * * * *